United States Patent
Bear et al.

(10) Patent No.: US 9,708,503 B2
(45) Date of Patent: *Jul. 18, 2017

(54) RESIN-POLYESTER BLEND BINDER COMPOSITIONS, METHOD OF MAKING SAME AND ARTICLES MADE THEREFROM

(71) Applicant: Hexion Inc., Columbus, OH (US)

(72) Inventors: Jeremiah D. Bear, Lousiville, KY (US); Gregory D. Briner, Springfield, OR (US); Thomas L. McNeal, Louisville, KY (US)

(73) Assignee: HEXION INC., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,950

(22) Filed: May 15, 2015

(65) Prior Publication Data
US 2015/0247056 A1 Sep. 3, 2015

Related U.S. Application Data

(63) Continuation of application No. 12/037,231, filed on Feb. 26, 2008, now Pat. No. 9,062,202.

(60) Provisional application No. 60/903,475, filed on Feb. 26, 2007.

(51) Int. Cl.
| | | |
|---|---|---|
| *C08L 67/02* | (2006.01) | |
| *C09D 161/24* | (2006.01) | |
| *C09D 167/02* | (2006.01) | |
| *C08L 61/24* | (2006.01) | |
| *C08L 67/00* | (2006.01) | |
| *B24D 3/28* | (2006.01) | |
| *C08L 67/03* | (2006.01) | |
| *C08J 7/04* | (2006.01) | |
| *C08G 63/688* | (2006.01) | |

(52) U.S. Cl.
CPC ............ *C09D 161/24* (2013.01); *B24D 3/285* (2013.01); *C08G 63/6884* (2013.01); *C08L 61/24* (2013.01); *C08L 67/00* (2013.01); *C09D 167/02* (2013.01); *C08G 63/6886* (2013.01); *C08J 7/047* (2013.01); *C08J 2467/02* (2013.01); *C08L 67/02* (2013.01); *C08L 67/03* (2013.01)

(58) Field of Classification Search
CPC ...................................................... C08L 67/02
See application file for complete search history.

(56) References Cited

U.S. PATENT DOCUMENTS

| | | | |
|---|---|---|---|
| 1,910,444 A | 5/1933 | Nicholson | |
| 2,906,660 A | 9/1959 | Hungerford et al. | |
| 3,012,929 A | 12/1961 | Jackson | |
| 3,041,156 A | 6/1962 | Rowse et al. | |
| 3,050,427 A | 8/1962 | Morgan et al. | |
| 3,103,461 A | 9/1963 | Smith et al. | |
| 3,228,825 A | 1/1966 | Waggoner | |
| 3,734,874 A | 5/1973 | Kibler et al. | |
| 3,760,458 A | 9/1973 | Pitt | |
| 3,766,003 A | 10/1973 | Schuller | |
| 3,779,993 A | 12/1973 | Kibler et al. | |
| 3,838,995 A | 10/1974 | Smith | |
| 3,905,067 A | 9/1975 | Keib et al. | |
| 3,907,736 A * | 9/1975 | Barton ............... | D06M 15/423 442/102 |
| 4,145,469 A | 3/1979 | Newkirk et al. | |
| 4,233,196 A | 11/1980 | Sublett | |
| 4,258,098 A | 3/1981 | Bondoc et al. | |
| 4,304,901 A | 12/1981 | O'Neill | |
| 4,314,827 A | 2/1982 | Leitheiser et al. | |
| 4,477,496 A * | 10/1984 | Das ........................ | C03C 25/26 427/375 |
| 4,493,872 A * | 1/1985 | Funderburk ....... | C08G 63/6886 427/250 |
| 4,560,612 A | 12/1985 | Yau | |
| 4,623,364 A | 11/1986 | Cottringer | |
| 4,744,802 A | 5/1988 | Schwabel | |
| 4,770,671 A | 9/1988 | Monroe et al. | |
| 4,881,951 A | 11/1989 | Monroe et al. | |
| 4,888,381 A | 12/1989 | Pankratz | |
| 4,917,764 A | 4/1990 | Laiwani et al. | |
| 4,920,199 A | 4/1990 | Jarzombek et al. | |
| 4,997,461 A | 3/1991 | Markhoff-Matheny et al. | |
| 5,009,675 A | 4/1991 | Kunz et al. | |
| 5,011,508 A | 4/1991 | Wald et al. | |
| 5,042,991 A | 8/1991 | Kunz et al. | |
| 5,085,671 A | 2/1992 | Martin et al. | |
| 5,104,731 A * | 4/1992 | Gager .................. | G03G 7/0013 252/500 |
| 5,213,591 A | 5/1993 | Celikkaya et al. | |
| 5,290,631 A | 3/1994 | Fleury et al. | |
| 5,334,648 A | 8/1994 | Drews et al. | |
| 5,342,877 A | 8/1994 | Clark | |
| 5,362,842 A | 11/1994 | Graves et al. | |
| 5,369,210 A | 11/1994 | George et al. | |
| 5,389,716 A | 2/1995 | Graves | |
| 5,518,586 A | 5/1996 | Mirous | |
| 5,646,237 A | 7/1997 | George et al. | |
| 5,698,302 A | 12/1997 | Brandon et al. | |
| 5,698,304 A | 12/1997 | Brandon et al. | |
| 5,704,952 A | 1/1998 | Law et al. | |
| 5,709,940 A | 1/1998 | George et al. | |
| 5,733,952 A | 3/1998 | Geoffrey | |
| 5,772,846 A | 6/1998 | Jaffee | |
| 5,804,254 A | 9/1998 | Nedwick et al. | |
| 5,851,933 A | 12/1998 | Swartz et al. | |
| 5,912,281 A | 6/1999 | Clark et al. | |
| 5,914,365 A | 6/1999 | Chang et al. | |
| 6,344,503 B1 | 2/2002 | Nkansah et al. | |

(Continued)

OTHER PUBLICATIONS

Flick, E.W. Handbook of Adhesive Raw Materials, 1989, 255; Noyes Publications.

*Primary Examiner* — Michael Pepitone

(57) ABSTRACT

An aqueous binder system including a mixture of urea-formaldehyde resin and water-dispersible polyester resin. A combination of the binder system applied to fiber insulation, a composite glass mat, glass/polyester mat, polyester mat, or substrate of a coated abrasive product. Fiber insulation, a composite glass mat, glass/polyester mat, polyester mat, or coated abrasive product with the binder system including urea-formaldehyde resin and water-dispersible polyester.

24 Claims, No Drawings

(56) References Cited

U.S. PATENT DOCUMENTS

| | | |
|---|---|---|
| 6,384,116 B1 | 5/2002 | Chan et al. |
| 6,523,950 B1 * | 2/2003 | Lawrence ................ B41M 5/52 347/105 |
| 6,544,911 B2 | 4/2003 | Peng et al. |
| 6,582,819 B2 | 6/2003 | McDaniel et al. |
| 6,600,142 B2 * | 7/2003 | Ryan .................... C09D 167/00 219/634 |
| 6,642,299 B2 | 11/2003 | Wertz et al. |
| 9,062,202 B2 * | 6/2015 | Bear ................... C08G 63/6884 |
| 2003/0148106 A1 | 8/2003 | Ma et al. |
| 2004/0159654 A1 | 8/2004 | Ryan et al. |
| 2005/0191922 A1 | 9/2005 | Xing et al. |
| 2007/0039703 A1 | 2/2007 | Lee et al. |

* cited by examiner

RESIN-POLYESTER BLEND BINDER COMPOSITIONS, METHOD OF MAKING SAME AND ARTICLES MADE THEREFROM

RELATED APPLICATION DATA

This application is a continuation application of U.S. patent application Ser. No. 12/037,231, filed Feb. 26, 2008, now U.S. Pat. No. 9,062,202, which application claims the benefit of U.S. Provisional Application Ser. No. 60/903,475 filed Feb. 26, 2007, the entire contents of the applications are hereby incorporated by reference.

FIELD OF THE INVENTION

The invention relates to binder compositions comprising a mixture of a resin and water dispersible polyester. More particularly, the invention relates to binder compositions comprising a blend of urea-formaldehyde ("UF") and water dispersible polyester. The invention also relates to methods of preparing the binder compositions, and to articles bound with the binder compositions such as building products and adhesive products.

BACKGROUND OF THE INVENTION

UF-binders are used in a number of products. For example, they are useful as binders for nonwoven fibrous mats or abrasives applications. When used as a binder, the UF-binders may be modified with polymer latex, such as hydroxyacrylic, acrylate, styrene polymers or copolymers such as styrene-butadiene, styrene maleic anhydride, and vinyl monomers such as polyvinyl acetate. Acrylic copolymer latex, such as a self-cross linking acrylic copolymer of an anionic emulsifying type has been used as one component of at least a two component binder for bonding glass fibers and particulate thermoplastic to make a glass fiber reinforced sheet that can later be hot molded into various shapes and articles.

These modifiers are added because UF-resins are very brittle upon curing, and this can cause certain strength properties to decrease due to failure mechanisms associated with brittle systems. However, the use of latex polymer in the binder, alone or as a UF-modifier, increases process time and product cost. Using polymer latex as a binder, or adding polymer latex to UF-binder, is expensive as compared to using UF-polymer solutions as binders. Also, handling of the latex solutions requires large storage facilities with associated transportation costs, handling and mixing processes that complicate binder preparation.

Moreover, the acidic nature of latexes is likely to affect the pH and reactivity, and thus the cure speed and performance, of the UF-resin. In addition, common neutralizers of latex acids can react with UF-resin to consume free formaldehyde, lower pH, and/or decrease final product shelf life.

Shelf life of UF binders as it pertains to the manufacture of wet laid nonwoven fiber mats is determined by measuring both the neat binder integrity and its water dilution stability. Neat resin integrity is depicted as supplied binder characteristics such as viscosity and uniformity. Water dilution stability is depicted as the amount of precipitation that occurs in water over time. Precipitation of binder will cause fall-out during mat processing, creating need for maintenance downtime and the addition of unnecessary costs to the process. As UF binder ages, the viscosity will increase, separations can occur, and water dilution properties will diminish, eventually making the binder unfit for use as a wet-laid nonwoven binder. Standard non-latex modified UF resin binder typically has a shelf life (neat resin integrity and dilution stability) up to about 30 days.

Latexes can maintain their "neat" shelf life for up to and often in excess of 6 months, but their water dilution properties are more sensitive. When latexes are diluted, their particles move further from one another, destabilizing the surfactant and ionic protection in water. This effect is exaggerated when mixed in UF resin because of the additional polymer and chemical interactions. Latex can significantly decrease the shelf life of a UF resin.

U.S. Pat. Nos. 4,258,098; 4,560,612 and 4,917,764 disclose the use of styrene-butadiene latex-modified, UF resin compositions as a binder for glass fiber mats.

U.S. Pat. No. 5,334,648 discloses emulsion copolymers, for use as UF resin modifiers, formed from vinyl chloride monomers, softening monomers, and functional monomers. These binders are particularly useful as glass mat binders for the production of roofing shingles.

U.S. Pat. No. 5,389,716 discloses a binder composition for fibrous mats which includes a stable mixture of an aqueous aldehyde condensation polymer-based resin and fire retardant latex. The weight ratio of the latex to the resin is at least 1:1. The composition optionally includes an amount of silica colloid sufficient to enhance the flame resistant property.

U.S. Pat. No. 5,518,586 discloses a UF resin modified with a water-insoluble anionic phosphate ester used as binder in the preparation of glass fiber mats using a hydroxyethyl cellulose white water system.

U.S. Pat. No. 5,804,254 discloses a method for flexibilizing a glass fiber nonwoven bound with a cured UF resin binder, where the binder includes a cured UF resin and 0.5-5% by weight, based on the weight of the UF resin, of a water-soluble polymer comprising 40-100% by weight, based on polymer weight, of a polymerized ethylenically unsaturated carboxylic acid monomer, the polymer having a weight average molecular weight from 100,000 to 2,000,000.

U.S. Pat. No. 5,851,933 discloses method for making non-woven fibrous mats. The mats comprise glass fiber bonded together with a dried and cured mixture of aqueous UF resin and a self crosslinking copolymer of vinyl acrylic or polyvinyl acetate.

U.S. Pat. No. 5,914,365 discloses an aqueous UF fiber mat adhesive binder formulation modified by the addition of a minor amount of a water-soluble, styrene-maleic anhydride (SMA) copolymer.

U.S. Pat. No. 6,384,116 discloses a binder composition comprising a UF resin modified with a water-soluble nonionic amine oxide and optionally further modified with anionic acrylic latex and/or a water-soluble polymer comprising 40-100% by weight, based on polymer weight, of a polymerized ethylenically unsaturated carboxylic acid monomer. The polymer has a weight average molecular weight from 100,000 to 2,000,000.

U.S. Pat. No. 6,544,911 discloses a coated fiber mat where the coating comprises a cured, non-woven, fiber glass mat containing a polysiloxane. The fibers are fixedly distributed in a formaldehyde type binder containing a binder modifier which is a crosslinked styrene/acrylic polymer.

U.S. Pat. No. 6,642,299 discloses an aqueous binder composition containing a UF resin modified with an additive comprising (1) styrene acrylic acid or styrene acrylate, (2) an adduct of styrene, maleic anhydride, and an acrylic acid or acrylate or (3) a physical mixture of a styrene acrylic acid or styrene-acrylate copolymer and a styrene-maleic anhydride copolymer. The resulting binder is used in the preparation of fiber mats.

U.S. Pat. No. 6,682,574 discloses use of UF-resin as a binder for abrasive articles and is by incorporated herein by reference in its entirety.

In light of the above, there is a need in the art for UF resin binder compositions, which provide for improved wet and dry tensile properties, tear strength, cure speed and mat caliper. There is another need in the art for UF resin binder compositions which provide a lower raw material cost, when compared to traditionally modified binders. There is still another need in the art for UF resin binder compositions which may be supplied in a one-piece package and which exhibits adequate foam control, without excessive amounts of defoamers.

SUMMARY OF THE INVENTION

The present invention provides a binder system comprising a water-dispersible polyester and a water-dispersible resin, for example a water-dispersible urea-formaldehyde resin.

This invention discloses compositions and methods for preparing binders comprising a UF resin and a water-dispersible polyester.

The term "water-dispersible" is used interchangeably with other descriptors such as "water-dissipatible", "water-soluble" or "water-dispellable" or "waterborne". All of these terms refer to the activity of water or a mixture of water with a water-miscible organic solvent on the polyesters or other water-dispersible resins described herein. This terminology includes conditions where the polyester or other water-dispersible resin is dissolved to form a true solution or is dispersed as liquid or finely divided solids within an aqueous medium. Due to the statistical nature of polyester compositions and the other water-dispersible resins, it is possible to have soluble and dispersible fractions when a single polyester or other water-dispersible resin is acted upon by an aqueous medium.

The polyester may be a non-sulfonated or sulfonated polyester or blends thereof. The polyester is a water dispersible or water soluble polyester resin of moderate to high molecular weight to uncured urea-formaldehyde (UF) resin. Preferably the polyester has a weight average molecular weight range of 10,000 to 500,000. More preferably the polyester has a weight average molecular weight range of 20,000 to 75,000, or 25,000 to 70,000 or 30,000 to 60,000.

The polyester resin can be a sulfopolyester formed as a polycondensation product of a first reaction mixture and a second reaction mixture. The first reaction mixture can have (a) at least about 70 mol. % of dicarboxylic acid or an ester, and (b) about 4-20 mol. % of a difunctional ester forming sulfomonomer containing at least one metal sulfonate group attached to an aromatic nucleus, and functional groups selected from the group consisting of hydroxyls, carboxyls and alkyl esters for a total of 100 mol. % for the first reaction mixture. In one embodiment it is also possible that the first reaction mixture (a) further comprises from about 0.1 mol. % to about 5 mol. % of a saturated aliphatic or a saturated alicyclic dicarboxylic acid, or ester. The second reaction mixture can have a mixture comprising ethylene glycol, diethylene glycol and an optional triethylene glycol for a total mol. % for the second reaction mixture of 100 mol. %

In one embodiment it is possible for the first reaction mixture to contain from about 85 to about 90 mol. % terephthalic acid and from about 10 to about 15 mol. % of the difunctional ester forming sulfomonomer, and the second reaction mixture to contain from about 40 mol. % to about 60 mol. % ethylene glycol.

In another embodiment it is possible for the first reaction mixture to contain (a) about 70 mol. % of terephthalic acid or an ester thereof, and (b) about 4-20 mol. % of a difunctional ester forming sulfomonomer containing at least one metal sulfonate group attached to an aromatic nucleus and functional groups selected for the group consisting of hydroxyls, carboxyls and alkyl esters. In this embodiment the second reaction mixture contains at least two different glycols and at least about 20 mol. % of the second reaction mixture is ethylene glycol.

In one embodiment it is also possible for the sulfopolyester to have an inherent viscosity of at least about 0.20 dL/g measure at 250° C. in 60/40 parts by weight of a phenol/tetrachloroethane solvent at a concentration of 0.25 g/dL. Additionally, the difunctional ester that forms the sulfomonomer can be 5-sodiosulfoisophthalic acid or an ester thereof, and the mole ratio of terephthalic acid to 5-sodiosulfoisophthalic acid is approximately 80-90/20-10.

The binder system can be used for any of the typical uses of UF-resins. For example, the binder may be applied to a glass mat, glass/polyester composite mat, or polyester mat used in the building industry as facing or reinforcement for building products. For example, for asphalt shingles the binder system can improve tensile strength while maintaining (or improving) asphalt coating characteristics. Other typical uses include facing or reinforcement for foamed laminates or gypsum board products as well as binder for coated abrasive products. The binder system can also be essentially free from latex. In one embodiment it is possible that the binder has a total polymer content of the urea-formaldehyde resin and polyester resin of about 60 weight % or less. In an alternate embodiment based on the total polymer content of the urea-formaldehyde resin and polyester resin, the binder contains from about 40 weight % to about 95 weight % of the polyester resin and from about 5 weight % to about 60 weight % of the urea-formaldehyde resin, more specifically from 60 weight % to about 80 weight % of the polyester resin and from about 20 weight % to about 40 weight % of the urea-formaldehyde resin.

The addition of the polyester into the UF resin is intended provide toughness and or strength to the UF binder system.

The mixture comprises about 0.05 to about 95 wt % the water dispersible polyester resin based upon the dry weight of the urea-formaldehyde resin, more specifically from 0.1 to about 95 wt %, or 0.01 to about 90 wt % or even more specifically from 10 to about 25 wt %. Typical ranges of use of the polyester to the resins vary according to the end use. For example 1-20% polyester based upon weight of the UF resin when used as a binder for glass mat, 1-20% polyester based upon weight of the UF resin when used as a binder for coated abrasives, 20-95% polyester based upon weight of the UF resin when used as a binder for composite mat, or more specifically 50-90% polyester. The composite mat can also have a percent retention of at least 50%.

Not wishing to be limited by theory, the polyester could fundamentally improve performance of glass mat UF by incorporating polyester domains in the final cured matrix and/or helping the reduction of potential void formation at higher cure temperatures.

It is theorized that the polyester and UF resin do not crosslink or do not substantially crosslink.

Moreover, the aqueous binder preferably contains substantially no cross-linking agents, for example, no UF or melamine formaldehyde resins which may be cross-linking resins or amino resin cross-linking agents, isocyanates, cross-linked polymers, epoxy, unreacted epoxy, polyester resins with urethane in the polyester backbone, phosphate-containing polymer, hydroxyethyl acrylate, no organic solvent, and/or solid particulates. If desired the aqueous binder contains substantially no polyether polyol, and/or polyhydroxy polyester.

Unless specified, the percentages used throughout the specification are by weight. Additionally, unless specified, the average molecular weights used throughout the specification are weight average molecular weights.

DETAILED DESCRIPTION OF THE PREFERRED EMBODIMENTS

The present invention provides a binder system comprising a water-dispersible thermosetting UF resin and a water-dispersible polyester. The binder has a number of uses. For example, the binder may be applied to non-woven fibers, glass mat, glass/polyester composite mat, polyester mat, or coated abrasives to improve tensile strength, durability and toughness. The modification of thermosetting urea-formaldehyde resin-based binder with water-dispersible medium to high molecular weight polyester results in an improved product.

The invention advantageously replaces binder systems of 100% acrylic latex or UF/latex blends while at least maintaining current performance properties of the end product.
Polyester The polyester is a water dispersible polyester resin of moderate to high molecular weight. Preferably the polyester has a weight average molecular weight range of 10,000 to 500,000 daltons. More preferably the polyester has a weight average molecular weight range of 25,000 to 75,000 daltons.

The term "polyester", as used herein, encompasses both "homopolyesters" and "copolyesters" and means a synthetic polymer prepared by the polycondensation of difunctional carboxylic acid with at least one difunctional hydroxyl compound, e.g., a diol or glycol component. As used herein, the term "sulfopolyester" means any polyester comprising a sulfomonomer. In this description the term "polyester" encompasses polyester polymers with and without the sulfomonomer.

The water-dispersible polyesters, include dicarboxylic acid monomer residues, diol monomer residues, and repeating units, and, if a sulfopolyester, sulfomonomer residues.

The term "residue", as used herein, means any organic structure incorporated into the polymer through a polycondensation reaction involving the corresponding monomer. Thus, the term "monomer residue", as used herein, means a residue of a dicarboxylic acid, a diol, a sulfomonomer, or a hydroxycarboxylic acid. Thus, the dicarboxylic acid residue may be derived from a dicarboxylic acid monomer or its associated acid halides, esters, salts, anhydrides, or mixtures thereof, useful in a polycondensation process with a diol to make a medium to high molecular weight polyester.

A "repeating unit", as used herein, means an organic structure having 2 monomer residues bonded through a carbonyloxy group.

The polyesters may be crystalline, semi-crystalline or amorphous materials. The polyesters may be linear or branched, but are typically linear.

The glass transition temperature (Tg) of the polyester may vary within a wide range. For example, the Tg (as measured by modulated differential scanning calorimetry) is typically in the range of from −90 to 100° C. Typically the polyester or sulfopolyester has a Tg from 0 to 70° C. or 20 to 60° C.

The particular combination of dicarboxylic acid component and difunctional hydroxyl component is stipulated only by the requirements that the final product is water-dispersibile. The dicarboxylic acid component of the polyester is selected from aliphatic, alicyclic, and aromatic dicarboxylic acids. Typical dicarboxylic acids useful in the present invention include aromatic dicarboxylic acids preferably having 8 to 14 carbon atoms, saturated aliphatic dicarboxylic acids preferably having 4 to 12 carbon atoms, and cycloaliphatic dicarboxylic acids preferably having 8 to 12 carbon atoms. It should be understood that use of the corresponding acid anhydrides, esters, and acid halides, e.g., acid chlorides of these acids is included in the term "dicarboxylic acid".

Examples of dicarboxylic acids are: terephthalic acid, phthalic acid, isophthalic acid, cyclohexanedicarboxylic acid, cyclohexanediacetic acid, diphenyl-4,4-dicarboxylic acid, succinic acid, glutaric acid, adipic acid, azelaic acid, sebacic acid, malonic acid, dimethylmalonic acid, succinic acid, dodecanedioic acid, trimethyladipic acid, pimelic, 2,2-dimethylglutaric acid, azelaic acid, sebacic acid, fumaric acid, suberic acid, maleic acid, itaconic acid, 1,3-cyclopentane dicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, diphenic acid, 4,4'-oxydibenzoic acid, diglycolic, thiodipropionic acid, 4,4'-sulfonyldibenzoic acid, 1,8-naphthalene dicarboxylic acid, naphthalene-2,6-dicarboxylic acid, and 2,5-naphthalene dicarboxylic acid.

Typical dicarboxylic acid(s) are isophthalic acid, terephthalic acid, dimethyl terephthalate, and dimethyl isophthalate.

The difunctional hydroxyl component of the polyester is selected from at least one member, or at least two members, of the group consisting of suitable aliphatic diols, cycloaliphatic diols, aromatic diols and combinations thereof. The aliphatic diols typically have 2 to 20 carbon atoms, and the cycloaliphatic diols typically have 6 to 20 carbon atoms. The diol component may also include mixtures of diols. Included within the class of aliphatic diols are aliphatic diols having ether linkages such as polydiols having 4 to 800 carbon atoms. Suitable diols include: ethylene glycol, diethylene glycol, triethylene glycol, 1,2-propanediol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,4-butanediol, 1,5-pentanediol, 1,6-hexanediol, 2,2,4-trimethyl-1,6-hexanediol, thioethanol, 1,2-cyclohexanedimethanol, 1,3-cyclohexanedimethanol, and 1,4-cyclohexanedimethanol.

Typical diol(s) are ethylene glycol, combinations of ethylene glycol with diethylene glycol, combinations of diethylene glycol with 1,4-cyclohexanedimethanol, combinations of ethylene glycol with 1,4-cyclohexanedimethanol, and combinations of ethylene glycol or diethylene glycol with a variety of suitable co-diols.

Poly functional alcohols are also available to one skilled in the art and provide the potential for branched polyesters. Such polyols include neopentyl glycol, butylene glycol, 1,4-butanediol, hexylene glycol, 1,6-hexanediol, the polyglycols such as diethylene glycol or triethylene glycol, etc., the triols such as glycerine, trimetylol ethane, trimethylol propane, etc. and other higher functional alcohols such as pentaerythritol, sorbitol, mannitol, and the like.

Hydrophilic water-dispersing groups (or groups which may be subsequently converted to such water-dispersing groups) are optionally introduced into the polyester oligomer(s) using two general methods: i) by utilizing in the polymerization process to form a polyester oligomer(s)

monomer(s) providing part of the acid or hydroxyl component which carry a hydrophilic water-dispersing group; or ii) utilizing monomer(s) providing part of the acid or a hydroxyl component which bears selected reactive groups and which monomer is subsequently reacted with a compound carrying a hydrophilic water-dispersing group and also a reactive group of the type which will react with the selected reactive groups on the monomer to provide attachment of the hydrophilic water-dispersing group to the polyester oligomer(s) via covalent bonding.

The hydrophilic water-dispersing groups, if present, should be present in sufficient level in the polyester oligomer(s) to impart water-dispersibility thereto. Suitable non-ionic hydrophilic water dispersing groups include for example ethylene oxide-containing hydroxy functional compounds such as alkoxypolyethlene glycols and polyethylene glycols.

Preferably the hydrophilic water-dispersing groups are carboxylic acid groups, sulphonic acid groups or sulphonate anion groups (neutralization of the sulphonic acid groups preferably already having been effected in the monomer). Preferably incorporation of carboxylic acid groups can occur by having a residual carboxylic acid functionality, post functionalization of hydroxy-functionalized polyester oligomer(s) or use of sterically hindered hydroxy functional acids such as dimethylolpropionic acid.

Typically for sulfopolyesters, the sulphonic acid or sulphonate anion containing monomer is a dicarboxylic acid monomer having at least one sulphonic acid salt group substituent. Alternatively, alkyl ester groups may be used in place of the carboxylic acid groups. Such a monomer will therefore be part of the acid component used in the polyester synthesis. Examples of such compounds are the alkali metal salts of sulphonic acid substituted aromatic dicarboxylic acids, for example alkali metal salts of 5-sulpho-1,3-benzene dicarboxylic acid, for example sodio-5-sulphoisophthalic acid (SSIPA). Other useful sulphonic acid containing monomers are the alkali metal salts of sulphonic acid substituted aromatic dicarboxylic acid-dihydroxyalkylesters such as the alkali metal salts of 5-sulpho-1,3-benzenedicarboxylic acid-1,3-bis(2-hydroxyethyl)ester.

If the polyester is prepared using monomer(s) providing acid or hydroxyl component which have an unsaturated group(s), the polyester will have un-saturation incorporated into its structure, and can if desired be subjected to a further stage of polymerization by a free radical mechanism, to cause chain-extension of the polyester and such a reaction would usually take place in an aqueous dispersion phase, rather than in the melt as when conducting the esterification polymerization process. Alternatively the unsaturated group in the polyester may be utilized to provide further functional groups, for example by reaction with an aminosilane, whereby the amino groups add to the double bonds via a Michael addition reaction, to introduce alkoxy silane functionality of the polyester. Any residual unsaturation may also be utilized for reaction with any fatty acid unsaturation.

Suitable monomers providing an acid component and an unsaturated group include but are not limited to fumaric acid, maleic acid, maleic anhydride and hydroxyalkyl(meth)acrylates, for example hydroxyethylmethacrylate.

The polyester(s) may be dispersed in water using techniques well known in the art. An aqueous dispersion of the polyester(s) may be readily prepared by adding water directly to the hot polyester melt until the desired solids content/viscosity is reached. Alternatively the polyester(s) may be dispersed in water by adding an aqueous pre-dispersion (or organic solvent solution) of the polyester(s) to the water phase. Still further an aqueous dispersion may be prepared by dispersion of the solidified melt from the condensation polymerization directly into water. The solidified melt is preferably in a form such as flake (which can often be obtained directly from the melt) or comminuted solid (obtained for example by grinding).

The polyester(s) normally do not require the use of an external surfactant when being dispersed into water, although surfactants and or high shear can be utilized to assist in the dispersion of the polyester(s) in water (even if it is self-dispersible). Suitable surfactants include but are not limited to conventional anionic, cationic and/or non-ionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The amount used is typically 0 to 15% by weight or 0.3 to 2% by weight based on the weight of the crosslinkable polyester oligomer(s).

The aqueous dispersion of the polyester(s) may be for example, a colloidal dispersion of the polyester(s) in water (i.e. an emulsion or latex) or a solution (molecular dispersion) of the polyester(s) in water, or a combination thereof.

The polyesters and sulfopolyesters can be prepared by conventional polycondensation procedures well-known in the art. Such processes include direct condensation of the dicarboxylic acids with the diol(s) or by ester interchange using lower alkyl esters. For example, a typical procedure consists of two stages. The first stage, known as ester-interchange or esterification, is conducted in an inert atmosphere at a temperature of 175° C. to 240° C. for 0.5 to 8 hours. The diols, depending on their particular reactivities and the specific experimental conditions employed, are commonly used in molar excesses of 1.05 to 2.5 per mole of total dicarboxylic acid.

The second stage, referred to as polycondensation, is conducted under reduced pressure at a temperature of 230° C. to 350° C. for 0.1 to 6 hours in one or more steps.

Stirring or appropriate conditions are employed in both stages to ensure sufficient heat transfer and surface renewal for the reaction mixture. The reactions of both stages are facilitated by appropriate catalysts which are well known in the art. Suitable catalysts include, but are not limited to, alkoxy titanium compounds, alkali metal hydroxides and alcoholates, salts of organic carboxylic acids, alkyl tin compounds and metal oxides.

Typical polycondensation involves a liquid phase polycondensation step and may further involve a solid phase polycondensation step. In the liquid phase polycondensation step, the low condensate obtained through the esterification step is polycondensed under heating at a temperature of not lower than the melting point of a polyester, usually at 250 to 280° C., under reduced pressure in the presence of the aforesaid catalyst for polyester preparation. The polycondensation reaction is desirably carried out with distilling off the unreacted diol from the reaction system.

The liquid phase polycondensation reaction may be carried out in one step, or may be carried out in plural steps.

An organic solvent may optionally be added before or after the polymerization process to control the viscosity. Examples of solvents include water-miscible solvents such as N-methylpyrrolidone, glycol ethers such as butyldiglycol, diglyme and alkyl ethers of glycol acetates or mixtures of N-methylpyrrolidone and methyl ethyl ketone. Optionally no organic solvents are added.

The polyester obtained through the liquid phase polycondensation steps can be further subjected to solid phase polycondensation, if desired. The particulate polyester to be fed to the solid phase polycondensation step may be precrystallized by heating at a temperature of lower than the solid phase polycondensation temperature, followed by feeding it to the solid phase polycondensation step.

The precrystallization can be achieved by heating the particulate polyester in a dry state at a temperature of usually 120 to 200° C., preferably 130 to 180° C., for a period of 1 minute to 4 hours. The precrystallization can also be achieved by heating the particulate polyester at a temperature of 120 to 200° C. for a period of not shorter than 1 minute in an atmosphere of water vapor, an atmosphere of a water vapor-containing inert gas or an atmosphere of water vapor-containing air. The thus precrystallized polyester typically has a crystallinity of 20 to 50%.

The solid phase polycondensation includes at least one step and is carried out under the conditions of a temperature of 190 to 230° C.

The polyester preparation process including the esterification step and the polycondensation step can be carried out by batchwise, semi-continuously or continuously.

Sulfopolyesters

As mentioned above, the polyester may be sulfonated and contain repeat units from the above-listed at least one (or at least two) dicarboxylic acid and the above-listed at least one (or at least two) difunctional hydroxyl component as well as a difunctional sulfomonomer. The sulfopolyesters may be linear or branched, but are typically linear.

The sulfomonomer may be a dicarboxylic acid or an ester thereof containing a metal sulfonate group ($SO_3$), a diol containing a metal sulfonate group, or a hydroxy acid containing a metal sulfonate group. Suitable metal cations of the sulfonate salt may be $Na^+$, $Li^+$, $K^+$, $Mg^{++}$, $Ca^{++}$, $Ni^{++}$, $Fe^{++}$, $Fe^{+++}$, $Zn^{++}$ and substituted ammonium. The term "substituted ammonium" refers to ammonium substituted with an alkyl or hydroxy alkyl radical having 1 to 4 carbon atoms. It is within the scope of this invention that the sulfonate salt is non-metallic and can be a nitrogenous base as described in U.S. Pat. No. 4,304,901 which is incorporated herein by reference.

The choice of cation will influence the water-dispersibility of the resulting sulfopolyester. Monovalent alkali metal ions yield polyesters that are less readily dissipated by cold water and more readily dissipated by hot water, while divalent and trivalent metal ions result in polyesters that are not ordinarily easily dissipated by cold water but are more readily dispersed in hot water. Depending on the end use of the polymer, either of the different sets of properties may be desirable. It is possible to prepare the sulfopolyester using, for example, a sodium sulfonate salt and later by ion-exchange replace this ion with a different ion, for example, calcium, and thus alter the characteristics of the polymer. In general, this procedure is superior to preparing the polymer with divalent salts because the sodium salts are usually more soluble in the polymer manufacturing components than are the divalent metal salts. Polymers containing divalent and trivalent metal ions are normally less elastic and rubber-like than polymers containing monovalent ions.

The difunctional sulfomonomer contains at least one sulfonate group attached to an aromatic nucleus wherein the functional groups are hydroxy, carboxy or amino. Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Examples of sulfomonomers include sulfophthalic acid, sulfoterephthalic acid, sulfoisophthalic acid, 5-sodiosulfoisophthalic acid, 4-sulfonaphthalene-2,7-dicarboxylic acid, and their esters. Metallosulfoaryl sulfonate which is described in U.S. Pat. No. 3,779,993, and is incorporated herein by reference, may also be used as a sulfomonomer.

The sulfomonomer is present in an amount to provide water-dispersibility to the sulfopolyester. It is possible to adjust the water-dispersibility of the sulfopolyester by varying the mole percentage of sulfomonomer. Typically, the sulfomonomer is present in an amount of from 5 to 40 mole percent based on the sum of the moles of total dicarboxylic acid content.

A buffer may be added to the sulfopolyester. Buffers and their use are well known in the art and do not require extensive discussions. Typical buffers include sodium acetate, potassium acetate, lithium acetate, sodium phosphate monobasic, potassium phosphate dibasic and sodium carbonate. The buffer is present in an amount of up to 0.2 moles per mole of difunctional sulfomonomer. Typically, the buffer is present in an amount of about 0.1 moles per mole of difunctional sulfomonomer.

Procedures for preparing sulfopolyesters are given in numerous U.S. patents (U.S. Pat. Nos. 3,734,874; 3,779,993; 4,233,196; 5,290,631; 5,369,210, 5,646,237 and 5,709,940, among others) all incorporated herein by reference in their entirety. A typical synthesis procedure is given in Example 1 of U.S. Pat. No. 5,646,237. This example illustrates sulfopolyester preparation from the dimethyl esters of terephthalic acid and 5-sodiosulfoisophthalic acid. With minor variations, this method can be adapted to prepare a sulfopolyester from terephthalic acid and 5-sodiosulfoisophthalic acid. A preferred sulfopolyester composition is prepared in the manner described in Example 3 of U.S. Pat. No. 5,646,237, wherein the final sulfopolyester composition has an 89/11 mol. ratio of terephthalic acid/5-sodiosulfoisophthalic acid ("5-SSIPA") residues and a 56/43/1 mol. ratio of ethylene glycol/diethylene glycol/PTMG 1000 (commercially available from Mitsubishi Chemical Corp, Minato-ku, Tokyo) residues. As mentioned above, the term "residues" refers to polymer units remaining from the respective monomer(s). Thus, an 89/11 mol. ratio of terephthalic acid residue/5-SSIPA residue indicates the same mol. ratio in the monomers used to produce the polymer.

Typical sulfopolyesters contain ethylene terephthalate repeat units, for example, sulfopolyesters containing at least about 70 mol. % terephthalic acid residues and at least about 20 mol. % ethylene glycol residues (dicarboxylic acid residues and glycol residues sum to 200 mol. %.

When using terephthalic acid, additional dicarboxylic acids that can be used in making suitable sulfopolyesters include one or more of isophthalic acid; 2,7-naphthalenedicarboxylic acid; 1,4-cyclohexanedicarboxylic acid and aliphatic dicarboxylic acids, such as adipic acid, glutaric acid, succinic acid, azelaic acid and sebacic acid. It should be understood that the use of the corresponding anhydrides, esters and acid halides, e.g., acid chlorides, is included in the term "dicarboxylic acid."

The difunctional ester forming sulfomonomer containing at least one metal sulfonate group is attached to an aromatic nucleus wherein the functional groups are hydroxy or carboxyl. Typically, the sulfomonomer is present in an amount from about 4 to about 25 mol. %, based on a total of all acid and hydroxyl equivalents being equal to 200 mol. %.

The difunctional ester forming sulfomonomer component of the polyester may advantageously be a dicarboxylic acid or an ester thereof containing a metal sulfonate group, a glycol containing a metal sulfonate group, or a hydroxy acid containing a metal sulfonate group. The metal ion of the sulfonate salt is preferably Na+, Li+, K+ and the like.

Advantageous difunctional ester forming sulfomonomer components are those wherein the sulfonate salt group is attached to an aromatic acid nucleus such as benzene, naphthalene, diphenyl, oxyphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters.

Typical glycols, in addition to ethylene glycol, include diethylene glycol, triethylene glycol, polyethylene glycols, and polyalkylene glycols. Suitable glycols include cycloaliphatic glycols preferably having 6 to 20 carbon atoms and aliphatic glycols preferably having 3 to 20 carbon atoms. Specific examples of such glycols are ethylene glycol, propylene glycol, 1,3-propanediol, 2,4-dimethyl-2-ethyl-hexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, diethanol, 2,2,4-trimethyl-1,6-hexanedio-1 thiodiethanol, 1,2-cyclohexanedimethanol, 1,3-cyclohexanedimethanol, 1,4-cyclohexanedimethanol, 2,2,4,4-tetra-methyl-1,3-cyclobutanediol, and p-xylylenediol. Mixtures of glycols may also be used.

Poly functional alcohols are also available to one skilled in the art and provide the potential for branched polyesters. Such polyols include neopentyl glycol, butylene glycol, 1,4-butanediol, hexylene glycol, 1,6-hexanediol, the polyglycols such as diethylene glycol or triethylene glycol, etc., the triols such as glycerine, trimetylol ethane, trimethylol propane, etc. and other higher functional alcohols such as pentaerythritol, sorbitol, mannitol, and the like.

A glycol combination is ethylene glycol, diethylene glycol, and polytetramethylene glycol 1000 as described in U.S. Pat. No. 5,646,237, Example 1. It has been found experimentally that sulfopolyesters prepared from ethylene glycol or mixtures of ethylene glycol and diethylene glycol may contain a few mol. % of triethylene glycol residues and perhaps higher polyethylene glycol residues as well. These residues are maintained at less than 10 mol. % by including a buffer, such as sodium acetate, in the polymerization mix as described in previously cited art.

Typically, the difunctional ester forming sulfomonomer component is 5-sodiosulfoisophthalic acid or its esters, and the glycol is a mixture of ethylene glycol and diethylene glycol.

The backbones of preferred sulfopolyesters contain the residue of the sodium salt monomer called 5-sodiosulfoisophthalic acid (SSIPA).

A preferred polyester dispersion used in accordance with the invention is TEXFILM 246NB, commercially available from Textiles Coated International, Manchester, N.H., a water dispersed sulfopolyester with a dry polymer Tg of 52° C. and 30% solids polymer solution available from Hexion Specialty Chemicals, Inc. of Columbus, Ohio.

Polyester-Acrylic Hybrids

If desired the polyester may be a water dispersible polyester-acrylic hybrid.

The term "polyester-acrylic hybrid", as used herein, encompasses water dispersible polyester-acrylic polymers. Polyester-acrylic "hybrids", like the name implies, are for the intended purpose of combining the properties of both polymers in a water dispersible system outside of "polymer blending". The word "hybrid" indicates something that cannot be obtained by merely mixing two components. Examples of hybrid systems, but not limited to, are RHEOPRINT 2000 and SENTHESIZE ED, currently available from Hexion Specialty Chemicals, Inc., of Columbus, Ohio, which are self crosslinking polyester acrylic hybrids.

In the polyester/acrylic type hybrid polymers for example. U.S. Pat. No. 5,912,281, incorporated herein by reference, relates to blends of water-dispersible polyesters or polyamides (polyester A) with polymer B containing repeat units from styrene/hydroxyalkyl(meth)-acrylate/methacrylic, acrylic acid to form aqueous dispersions. Although they call it a blend, in practice polymerization of the monomers in B is conducted in the presence of polyester A to prepare the desired dispersion. Therefore, the polymerization of acrylic monomers in the presence of polyester A that is being discussed in these patents (also refer to U.S. Pat. No. 5,342,877, incorporated herein by reference) is a form of "hybrid" that could be taken to mean that the properties of the dispersions cannot be achieved by simply mixing polyester A and acrylic polymer B in the same proportion but only through the polymerization of B in the presence of A.

Polyester-Acrylic Grafts

If desired the polyester may be a water dispersible polyester-acrylic graft resin.

Graft acrylic polyester copolymerization may be accomplished by a variety of conventional graft polymerization techniques including latex and suspension processes.

Polyesters can be reacted via bridging agents or unsaturation. Examples of bridging agents are described in U.S. Pat. No. 6,344,503 and the references therein.

If desired the polyester may be extended with polyols such as, but not limited to, polyethylene glycol or polyvinyl alcohol and combinations there of.

Urea-Formaldehyde Resins

In addition to the above-describe polyester resin at least one other water-dispersible UF resin is added to the mixture from which the binder system is formed. The other water-dispersible UF resin includes any from the following classes of high polymeric synthetic substances. UF resin includes thermosetting materials and cold setting materials.

The thermosetting urea-formaldehyde resin can be prepared from urea and formaldehyde monomers or from UF precondensates in manners well known to those skilled in the art, for example, as discussed in U.S. Pat. No. 6,582,819 (herein incorporated by reference in its entirety). Skilled practitioners recognize the urea and formaldehyde reactants are commercially available in many forms. Any form which can react with the other reactants and which does not introduce extraneous moieties deleterious to the desired reaction and reaction product can be used in the preparation of urea-formaldehyde resins useful in the invention. One particularly useful class of UF resins for use in preparing binders in accordance with the present invention is disclosed in U.S. Pat. No. 5,362,842, the disclosure of which is incorporated herein by reference.

Formaldehyde for making a suitable UF resin is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in preparing a UF resin in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde adducts, often in aqueous solution. Any form of urea or urea in combination with formaldehyde is suitable for use in the practice of the invention. Both urea prill and combined urea-formaldehyde products are preferred, such as Urea-Formaldehyde Concentrate or UFC 85 (60% formaldehyde, 25% urea and 15% water). These types of products are disclosed in, for example, U.S. Pat. Nos. 5,362,842 and 5,389,716.

Any of the wide variety of procedures used for reacting the principal urea and formaldehyde components to form a UF thermosetting resin composition also can be used, such as staged monomer addition, staged catalyst addition, pH control, amine modification and the like. Generally, the urea and formaldehyde are reacted at a mole ratio of formaldehyde to urea in the range of about 1.1:1 to 4:1, and more often at an F:U mole ratio of between about 2.1:1 to 3.2:1. Generally, the UF resin is highly water dilutable, if not water soluble.

Many thermosetting urea-formaldehyde resins which may be used in the practice of this invention are commercially available.

UF resins for glass mat application are commercially available, for example, from Georgia Pacific Resins, Inc., Atlanta, Ga., Hexion Specialty Chemicals, Inc. Columbus, Ohio, Dynea USA, Springfield, Oreg. and Nestle Resins Corp., Springfield, Oreg., may be used for glass fiber mat. These resins are prepared in accordance with the previous teachings and contain reactive methylol groups which upon curing form methylene or ether linkages. Such methylol-containing adducts may include N,N'-dimethylol, dihydroxymethylolethylene; N,N'-bis(methoxymethyl), N,N'-dimethylolpropylene; 5,5-dimethyl-N,N'dimethylolethylene; N,N'-dimethylolethylene; and the like.

Urea-formaldehyde resins useful in the practice of the invention generally contain 45 to 70%, and preferably, 55 to 65% non-volatiles, generally have a viscosity of 50 to 600 cps, preferably 150 to 400 cps, normally exhibit a pH of 7.0 to 9.0, preferably 7.5 to 8.5, and often have a free formaldehyde level of not more than about 3.0%, and a water dilutability of 1:1 to 100:1, preferably 5:1 and above.

The UF resin can be prepared from urea and formaldehyde monomers, or from UF pre-condensates, in manners well known to those skilled in the art. The preparation of UF resins is disclosed, for example in U.S. Pat. No. 6,642,299, incorporated herein by reference in its entirety Polyalkylenepolyamines such as triethylene tetramine, tetraethylenepentamine as well as ammonium hydroxide are typically added to UF resins during their manufacture to provide charge characteristics, and to moderate the subsequent curing rate of the resin. The amount of polyalkylenepolyamines used in the manufacture of the UF resin will generally vary from about 0 to 3% and preferably about 0.002 to about 1% by weight of the UF resin. The amount of aqueous ammonia used in the manufacture of the UF resin will generally vary from about 0% to about 20%, and preferably from about 3 to about 12%, of 26 Baume ammonia based on the weight of the UF resin. One such class of UF resins useful in the present invention is described in, for example, U.S. Pat. No. 5,362,842, incorporated herein by reference in its entirety.

The molar ratio of formaldehyde to urea in UF resins suitable for use in the invention can vary over a wide range such as from about 1.4 to about 3.0, and typically about 1.4 to about 2.4.

The UF resins, as well as the modified UF resins used in the invention, typically have a pH of from about 7 to about 8.5, a Brookfield viscosity of from about 50 to 500 cps, a free formaldehyde content of about 0 to 3%, preferably about 0.1 to 0.5%, a non-volatile content of about 45% to about 65% or 70%, and a water dilutability of about 1:1 to about 100:1, preferably about 10:1 to about 50:1. A typical modified UF resin, utilized in the binder compositions of the invention, has a non-volatile content of about 60%, a pH of about 8 and a Brookfield viscosity (Brookfield LVF #2/60 rpm, at 25° C.) of about 300 cps.

The UF resin portion is typically entirely unmodified urea-formaldehyde (UF) resin or a UF resin modified by adding a number of known plasticizing chemicals, monomers, or co-polymers, as are conventionally known in the art. These modifiers can include one or more of the following or similar materials: ammonia, amines, polyamines, amides, polyamides, glycols, sugar alcohols, carboxylic, polycarboxylic acids, and the like. For example, these resin modifiers may be selected from the group of ammonia, alkanolamines, or polyamines, such as an alkyl primary diamine, e.g., ethylenediamine (EDA). Additional modifiers, such as melamine, ethylene ureas, and primary, secondary and tertiary amines, for example, dicyanodiamide, can also be incorporated into UF resins used in the invention. Concentrations of these modifiers in the reaction mixture often will vary from 0.05 to 20.0% by weight of the UF resin solids. These types of modifiers promote hydrolysis resistance, polymer flexibility and lower formaldehyde emissions in the cured resin. Further urea additions for purposes of scavenging formaldehyde or as a diluent also may be used.

Optional Additional Polymers

If desired, in addition to the UF and polyester, an additional resin may be present. This additional resin is at least one member of the group consisting of acrylic polymer, styrene butadiene rubber (SBR), styrene maleic anhydride (SMA), polyurethane dispersion (PUD).

Acrylics include, for example, emulsion, water-soluble, alkali-soluble, and water swellable gels, based on homopolymers and copolymers.

Acrylic polymers may be prepared by from an acrylate and/or acrylic acid. The constituents of the polymer are dissolved in a suitable solution such as an aqueous solution of sodium hydroxide, ammonium hydroxide, potassium hydroxide, or combinations thereof. Typically about 1-5% of the polymer constituents are dissolved in the aqueous solution. The solution is heated, generally to about 70° C. to about 90° C., and held until all the polymer is in solution. The solution is then added to a urea-formaldehyde resin.

Alternatively the acrylic polymer is stored and afterwards combined with the urea-formaldehyde resin. Any suitable acrylic acid or acrylate may be used such as is methyl methacrylate, butyl acrylate, or methacrylate. Preferably, the acrylate is methyl methacrylate (MMA).

Optionally, the acrylic polymer is modified by 0.1% to 5% by weight thereof of acrylamide type monomer. The acrylamide material may be used individually or as mixtures thereof, e.g. acrylamide and N-methylolacrylamide, may be used. Small amounts of other monomers, such as carboxylic acids, e.g. methacrylic, fumaric or itaconic acid, also may be present, if desired, in the polymer.

The styrene-butadiene latex polymer component of the binder composition suitably may contain about 10% to 90% by weight of styrene and 90% to 10% by weight of butadiene.

Optionally the styrene-butadiene latex polymer is modified by 0.1% to 5% by weight thereof of acrylamide type monomer. The acrylamide material may be used individually or as mixtures thereof, e.g. acrylamide and N-methylolacrylamide, may be used. Small amounts of other monomers, such as carboxylic acids, e.g. methacrylic, fumaric or itaconic acid, also may be present, if desired, in the polymer.

Typically, about 30% to 70% styrene and 70% to 30% butadiene is used; optimally the ratio is about 40% styrene to about 60% butadiene.

Typical SMA copolymers for use in the present invention are described in U.S. Pat. No. 5,914,365 at column 5, line 29, through column 6, line 10, incorporated herein by reference. Such resins are composed of alternating styrene and maleic anhydride monomer units, arranged in random, alternating or block form. For example, suitable SMA copolymers may have the following generalized formula in the unneutralized form:

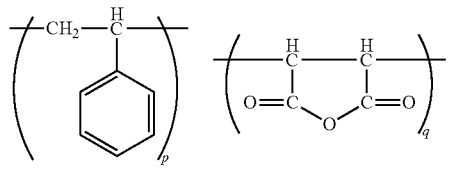

Wherein p and q are positive numbers in a ratio (p:q) that can vary from 0.5:1.0 to 5:1. Modified styrene-maleic anhydride copolymers, such as copolymers that are partially esterified or copolymers containing sulfonate groups on the benzene ring, also can be used according to the present invention.

Suitable styrene-maleic anhydride copolymers for practicing the present invention may normally have a weight average molecular weight from about 1,000 to about 500,000. Such unneutralized styrene-maleic anhydride (SMA) copolymers, used in accordance with the present invention, are initially insoluble in water, however after a sufficient extent of neutralization using an alkaline substance, such as a hydroxide, like sodium hydroxide, potassium hydroxide, ammonium hydroxide, lithium hydroxide, or cesium hydroxide; a carbonate, like sodium carbonate, potassium carbonate or ammonium carbonate; ammonia or an amine, the styrene-maleic anhydride copolymers become soluble in water. Any strongly basic alkali metal compound can be used for neutralizing the SMA, such as ammonium hydroxide, potassium hydroxide, sodium hydroxide, lithium hydroxide, cesium hydroxide, ammonium carbonate, potassium carbonate and/or sodium carbonate.

Although it generally is desirable to use the neutralizing agent in an amount sufficient to neutralize 100 mole % of the SMA copolymer, in the practice of the invention it is only necessary to neutralize the SMA sufficiently to obtain water solubility. The level of addition of any particular neutralizing agent to obtain an acceptable degree of water solubility is well within the normal skill in the art.

Polyurethane resins are made by mixing a polyisocyanate component, a polyhydroxy component and a catalyst. Typical urethanes are disclosed by U.S. Pat. No. 5,733,952 to Geoffrey and U.S. Patent Application Publication No. 2005/0191922 to Xing et al. The urethane may comprise, but is not limited to at least one member of an aliphatic polyurethane, an aromatic polyurethane, or a hybrid polyurethane. Polyurethanes which do not cross-link with polyesters employed in the present invention may be employed if desired. Polyurethanes which cross-link with polyesters employed in the present invention are not employed.

Typically the polyhydroxy component is a polyhydroxy phenolic component dissolved in solvent. Generally the solvents are mixtures of hydrocarbon and polar organic solvents such as organic esters. Exemplary hydrocarbon solvents include aromatic hydrocarbons such as benzene, toluene, xylene, ethyl benzene, high boiling aromatic hydrocarbon mixtures, heavy naphthas and the like. The polyhydroxy component is generally a phenolic resole resin or alkoxy modified resole resin as described above.

The isocyanate component may vary widely and has a functionality of 2 or more. As defined herein, polyisocyanates include isocyanates having such functionality of 2 or more, e.g., diisocyanates, triisocyanates, etc. Exemplary useful isocyanates are organic polyisocyanates such as tolylene-2,4-diisocyanate, tolylene-2,6-diisocyanate, and mixtures thereof, particularly crude mixtures thereof that are commercially available. Other typical polyisocyanates include methylene-bis-(4-phenyl isocyanate), n-hexyl diisocyanate, naphthalene-1,5-diisocyanate, cyclopentylene-1,3-diisocyanate, p-phenylene diisocyanate, tolylene-2,4,6-triisocyanate, and triphenylmethane-4,4',4"-triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following general formula:

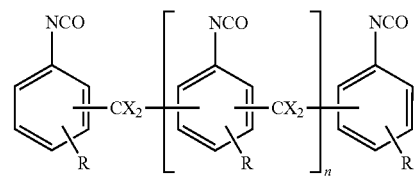

wherein R is selected from the group consisting of hydrogen, chlorine, bromine, and alkyl groups having 1 to 5 carbon atoms; X is selected from the group consisting of hydrogen, alkyl groups having 1 to 10 carbon atoms and phenyl; and n has an average value of generally about 0 to about 3. The preferred polyisocyanate may vary with the particular system in which the binder is employed.

In the practice of this invention with urethanes, coupling agents may be employed. Such coupling agents include, for example, organo silanes which are known coupling agents. The use of such materials may enhance the adhesion between the binder and the substrate. Examples of useful coupling agents of this type include amino silanes, epoxy silanes, mercapto silanes, hydroxy silanes and ureido silanes.

The above-described isocyanate and/or below-described epoxy compositions are cured by means of a suitable catalyst. The catalyst employed is generally a volatile catalyst or a liquid catalyst. At least enough catalyst is employed to cause substantially complete reaction of the polyhydroxy phenolic resin component and the isocyanate component and/or cure the epoxy.

Preferred exemplary curing catalysts are volatile basic catalysts, e.g., tertiary amine gases, which are passed through a mass of core particles being formed or coated, with an inert carrier such as air or carbon dioxide. Exemplary volatile tertiary amine catalysts which result in a rapid cure at ambient temperature that may be employed in the practice of the present invention include trimethyl-amine, triethylamine and dimethylethylamine and the like.

Exemplary liquid tertiary amines which are basic in nature include those having a $pK_b$ value in a range of from about 4 to about 11. The $pK_b$ value is the negative logarithm of the dissociation constant of the base and is a well-known measure of the basicity of a basic material. The higher the number is, the weaker the base. Bases falling within the mentioned range are generally, organic compounds containing one or more nitrogen atoms. Preferred among such materials are heterocyclic compounds containing at least one nitrogen atom in the ring structure. Specific examples of bases which have a $pK_b$ value within the range mentioned include 4-alkyl-pyridines wherein the alkyl group has from 1 to 4 carbon atoms, isoquinoline, arylpyridines, such as phenyl pyridine, acridine, methoxypyridine, pyridazines, 3-chloropyridine, and quinoline, N-methylimidazole, N-vinylimidazole, 4,4-dipyridine, phenylpropylpyridine, 1-methylbenzimidazole and 1,4-thiazine. Additional exemplary, suitable preferred catalysts include, but are not limited to, tertiary amine catalysts such as N,N-dimethylbenzylamine, triethylamine, tribenzylamine, N,N-dimethyl-1,3-propanediamine, N,N-dimethylethanolamine and triethanolamine. It is to be understood that various metal organic compounds can also be utilized alone as catalysts or in combination with the previously mentioned catalyst. Examples of useful metal organic compounds which may be employed as added catalytic materials are cobalt naphthenate, cobalt octate, dibutyltin dilaurate, stannous octate and lead naphthenate and the like. When used in combinations, such catalytic materials, that is the metal organic compounds and the amine catalysts, may be employed in all proportions with each other.

The liquid amine catalysts, if desired, can be dissolved in suitable solvents such as, for example, the hydrocarbon solvents mentioned hereinabove. The liquid amine catalysts are generally employed in a range of from about 0.5% to about 15% by weight, based on the weight of the phenolic resin component present in a composition in accordance with the invention.

The curing time can be controlled by varying the amount of liquid catalyst added. In general, as the amount of catalyst is increased, the cure time decreases. Furthermore, curing takes place at ambient temperature without the need for subjecting the compositions to heat, or gassing or the like.

Also, urethane binders typically have a curing exotherm that increases its temperature during curing. This higher temperature increases curing speed. If additional curing is desired, a small amount (less than 3 wt. %) of hot catalyst or hardener may be added during mixing.

In one embodiment of the present invention, the polyurethane modifier may be a polyurethane derivative. The polyurethane modifier may be derived, for example, from an aromatic isocyanate, an aliphatic isocyanate, or a precursor having acrylic functionality. Representative examples of aromatic polyurethanes include those derived from toluene diisocyanate or bis(4-isocyanatophenyl) methane. Examples of polyurethanes generally classified as aliphatic types include those derived from 1,6-hexamethylene diisocyanate, isophorone diisocyanate, bis(4-isocyanatocyclohexyl)methane; aromatic types include those derived from tetramethyl-m-xylidene diisocyanate and isopropenyldimethylbenzyl isocyanate. Polyurethanes derived from polyester based diol or polyol and aromatic isocyanate are generally referred to as polyester based aromatic polyurethanes, whereas those derived from a polyether based diol or polyol and an aliphatic isocyanate are referred to as polyether based aliphatic polyurethanes.

As will be apparent to one of ordinary skill in the art, the polyurethane modifier may be commercially available. Sancure® 898, 20023, 2725 and 2720 are examples of aliphatic polyurethanes, commercially supplied by Lubrizol, Wickliffe, Ohio. Hauthane L-2020 is an example of an aromatic polyurethane, commercially supplied by Hauthaway, Lynn, Mass. Other commercial or non-commercially available polyurethane modifiers are considered well within the scope and spirit of the present invention.

In one embodiment of the present invention, the urethane modifier has a Brookfield viscosity in the range of from about 100 cps to about 300 cps, and a specific density in the range from about 1.02 to about 1.06. Other ranges of the viscosity and specific density of the urethane modifier are considered within the scope and spirit of the present invention.

In one embodiment of the present invention, maleic acid may be employed with the urethane modifier and may hasten curing. The maleic acid may comprise a concentration of up to about 15 wt. % maleic acid with respect to the urethane modifier.

Forming the Binder System

The water-dispersible polyester resin and UF water-dispersible resin are blended at ambient conditions. They are then preferably diluted with water to the desired application viscosity or application solids at the site of the binder manufacture or at the site of mat forming.

Typically, the binder contains about 0.05 to about 50 weight % water soluble polyester, preferably about 0.05 to about 25 weight % water soluble polyester, more preferably from about 5 to about 20 weight % water soluble polyester, and most preferably from about 8 to about 12 weight % water soluble polyester, based upon the weight of the UF-resin.

However, typical ranges of use of the polyester to the resins vary according to the end use. For example 1-20% polyester based upon weight of the UF resin when used as a binder for glass mat, 1-20% polyester based upon weight of the UF resin when used as a binder for coated abrasives, or 50-90% polyester based upon weight of the UF resin when used as a binder for composite mat.

The aqueous mixture may be prepared by admixing water, the water-dispersible polyester, and the water-dispersible additional polymer, e.g., urea-formaldehyde resin, using conventional mixing or stirring techniques to provide a homogeneous solution. The resulting binder is a blend of unreacted phase separated water-dispersible polyester resin and the water-dispersible additional polymer.

The aqueous admixture may contain, in addition, conventional additives.

In order to insure suitable storage stability of the modified binder composition and proper performance during use of the binder composition, it is important that the pH of the aqueous mixture of the UF and adduct components end up within the range of about 6 to 9, and more preferably between about 7 and 8.5. Too low a pH causes premature curing of the UF resin and incompatibility of the constituents; too high a pH retards curing of the composition on heating during use.

Additives are used for special cases for special requirements. The binder systems of the invention may include a wide variety of additive materials. The coating may also include one or more other additives such as, for example, fillers, anti-migration aids, curing agents, neutralizers, coalescents, wetting agents, biocides, plasticizers, anti-foaming agents, colorants, waxes, anti-oxidants, a coupling agent (such as a silane or organosilane) to promote adhesion of the coating to substrate, a silicone lubricant, dyes, pigments, flow modifiers (such as flow control agents and flow enhancers), reinforcements (such as fibers), and/or anti-static agents. Other additives include humidity resistant additives or hot strength additives.

Although a surfactant is not necessary for stabilization of the aqueous dispersion of the present invention, the use of a surfactant or a combination of surfactants is not excluded. A list of surfactants, including suggested applications, is available in the treatise: McCutcheon's Emulsifiers & Detergents, North American Edition and International Edition, MC Publishing Co., Glen Rock, N.J., 1993. The sulfopolyesters of this invention serve as satisfactory stabilization agents for preparation of suitable polymers of this invention. The surfactants may be anionic, nonionic, cationic, amphoteric or mixtures thereof. Certain surfactants also operate as flow control agents. The additives may be added in combination or singly.

Organofunctional silanes may be employed as coupling agents to improve interfacial organic-inorganic adhesion. These organofunctional silanes are characterized by the following formula:

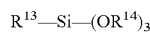

where $R^{13}$ represents a reactive organic function and $OR^{14}$ represents a readily labile alkoxy group such as $OCH_3$ or $OC_2H_5$. Particularly useful for coupling phenolic or furan resins to silica are the amino functional silanes of which Union Carbide A1100 (gamma aminopropyltriethoxysilane), commercially available from Union Carbide, Bound Brook, N.J. is an example. The silane can be premixed with the resin or added to the mixer separately.

Glass Fiber Insulation Forming

In a typical embodiment for making glass fiber insulation the following procedure is carried out. The glass is melted and run into a rapidly spinning disk where filaments are thrown out of a spinneret with centrifugal force. At this point the binder is sprayed on at a concentration of 10 to 20%, e.g., about 13% solids. The vaporization of the water cools the glass down and it falls unto a chain-type belt where it is accumulated with glass from other belts. Once accumulated, the glass travels through an oven where the resin binder is thermoset. The glass emerging from the oven is cut into the size that can be placed in a stud wall and several pieces are packaged by combining in a bundle, compressing the bundle, and wrapping it. The binder must be capable of allowing the glass mats to recover once they have been unwrapped. This curable binder of the present invention meets this need. When the glass fiber bundles of the present invention are stored in hot and humid warehouses, the product containing the inventive curable binder shows good recovery once they have been unwrapped. Typically, good recovery is necessary for good insulation value.

Roofing, Specialty, and Composite Mat Forming

When manufacturing reinforcing mats, the resulting mats exhibit a high degree of integrity, which is a balance of tensile strength and flexibility. The final end use or subsequent processing of any particular mat determines the product strength targets, whether higher tensile strength, flexibility, or a balance of properties is targeted. Mat tensile strength of ply goods are normally confirmed via tensile tester, such as those produced by Instron Corp. or Thwing-Albert. Mat flexibility is measured by various means such as Taber Stiffness, or % Elongation (specimen stretch during tensile testing). Such mats include those useful in, but not limited to, applications such as roofing, building construction, appliance manufacture, filtration, civil engineering, or automotive applications.

While many applications commonly use glass fibers, any number of organic or inorganic fibers maybe employed. The fibers used include, but are not limited to, glass, cellulose, polyester, polyethylene, polyimide, aramid, nylon, rayon, carbon, cotton, etc. Fiber selection is often based on the product exposure environment of the end application. Examples of various possible environments of use are high temperature, high humidity, corrosive, indoor-outdoor applications, etc.

Fibers may be either chopped strand or continuous. Continuous fibers may be extruded from bushings at the point of mat manufacture or feed to the system from bobbins, and some applications use both simultaneously. In the case of glass fibers, they may be either sized or un-sized (untreated). Sized fibers are chemically treated, or sized, with a plurality of sizing agents to provide opportunity for enhanced initial processing, bonding strength of the cured mats, to assist subsequent processing, or to modify final product strength or flexibility. Such mats can be formed by both 'wet laid' and 'dry laid' processes. These processes use either (or both) chopped fibers or continuous fibers.

Chopped strand fibers commonly in lengths of ¼" to 1¼" (0.5 to 3.5 cm) as well as diameters of 0.2-0.6 mils (5 to 16 microns), commonly noted as alpha designations of "D" to "M". A mixture of various fibers may also be employed as in the case of composite mats, such as both glass and polyester fibers in some specialty mats. Non-glass fibers, such as polyester fibers, may have other aspect designations for length and diameter such as denier (diameter). In addition, specialty composite mats may include what could be considered microfibers, such as those fibers with sub-micron diameter.

Glass fiber, specialty, or composite mats may be manufactured commercially by a "wet-laid process," descriptions of which may be found, for example in U.S. Pat. Nos. 2,906,660, 3,012,929, 3,050,427, 3,103,461, 3,228,825, 3,760,458, 3,766,003, 3,838,995 and 3,905,067 and 5,804,254. Typical uses of glass fiber mats are disclosed by U.S. Pat. No. 5,698,302 to Brandon et al. (facer sheet), U.S. Pat. No. 5,698,304 to Brandon et al. (facer sheet), and U.S. Pat. No. 5,772,846 to Jaffee (facer for boards) (all of which are incorporated herein by reference in their entirety.

In 'wet laid' system, chopped strand fibers are introduced into the aqueous pulp slurry as fiber bundles. Typically, fiberglass bundles contain 7,000-8,000 filaments while alternate fiber bundles may differ widely in count and are known to the art. The pulp slurry utilizing various pulping chemicals to create fiber dispersion. Thickeners, surfactants, defoamers, and biocides are commonly employed in pulping processes. Thickeners typical are, but limited to, polyacrylamide (such as MAGNAFLOC 835A, commercially available from Cytec, West Paterson, N.J.) or hydroxyethylcellulose (such as those grades under the Natrasol trademark). Thickeners are commonly used in conjunction with various surfactants to achieve fiber dispersion. Dispersion can also be obtained without thickener, in some cases, using air entrainment via unique surfactant dosing. Dispersion to complete fiber separation is normally required to achieve final strength and flexibility properties of the target product.

In mat forming for the 'wet laid' process, the fibers are collected on a wire screen in the forming section of the machine, normally by sectioned vacuum zones. A wet fiber mat is formed and excess water is removed additional vacuum in the usual manner. The mat transfers to an applicator wire where additional vacuum moisture removal prepares the mat for binder saturation. Binder saturation is generally accomplished by curtain coater or other applicator design known in the art. The mat is saturated in an excess of binder solution to insure complete coating of fibers and removing excess binder under vacuum.

The amount of the binder composition of the invention applied to the glass fiber mat is an amount sufficient to attain desired balance of strength and flexibility of the final cured product. The quantity of retained binder, often referred to as the LOI (Loss On Ignition), is the % organic binder by weight determined by burn off at ~600° C. The LOT can vary over a wide range such as that of loadings in the range of about 3% to 45%, and preferably about 10% to about 40% based on the dry weight of the bonded mat.

The binder treated mat then is dried and the binder composition is cured preferably in an oven at elevated temperatures of at least 200° C. Typically, convention UF/Latex binders at 90/10 blend ratios are thermally cured and dried at about 200 to 250° C. while acrylic and latex binders (approaching 100% of the binder mix) are cured at lower temperatures known to the art. A high degree of mat binder cure (~70% wet tensile retention after 10 minutes at 180° F. wet soak) is preferably obtained to retain the mat's required strength and processing characteristics over time. The degree of mat binder cure and moisture resistance to degradation is typically chosen to achieve final mat strength, asphalt coating properties, and handling/installation properties as desired to achieve industry standards for a particular specialty mat. The desired moisture resistance properties may vary depending upon the intended use for the mat.

Glass fiber, specialty, or composite mats may be manufactured commercially by a "dry laid process." Dry laid processes include spun bonding, electrospinning, spinning islands-in-sea processes, fibrillated films, melt blowing, and other dry laid processes known to one of skill in the art. An exemplary dry laid process starts with staple fibers, which can be separated by carding into individual fibers and are then laid together to a desired thickness by an aerodynamic or hydrodynamic process to form an unbonded fiber sheet. The unbonded fibers can then be subjected to hydraulic jets to both fibrillate and hydroentangle the fibers. A similar process can be performed on certain plastic films that when exposed to high pressure jets of water, are converted into webs of fibrillated fibers.

In 'dry process' mat forming, fiber entanglement and the required fiber orientation is achieved by either through bushing extrusion from a melt of glass or alternate chemistry, such as polyester. The forming section can be augmented with pre-formed alternate fibers pulled from bobbins or rolls, such as mesh scrim, known to the art. Various constructions of glass, specialty, or composite mats can be dry formed, including single pass composite laminate constructions.

Binder application to the formed mat is normally achieved by saturating the formed mat by curtain coater, spray, or dip pan. The 'dry process' binder application essential mirrors that for 'wet laid', previously described.

The binder treated mat then is dried and the binder composition is cured preferably in an oven at elevated temperatures of at least 200° C. The 'dry process' binder treated mat curing also closely mimics that for 'wet laid' mat previously described.

Coated Abrasive Article Forming

Coated abrasive articles generally contain an abrasive material, typically in the form of abrasive grains, bonded to a backing via of one or more adhesive layers. Such articles usually take the form of sheets, discs, belts, bands, and the like, which can be adapted to be mounted on pads, wheels or drums. Abrasive articles can be used for sanding, grinding or polishing various surfaces of, for example, steel and other metals, wood, wood-like laminates, plastic, fiberglass, leather or ceramics.

The backings used in coated abrasive articles are typically made of paper, polymeric materials, cloth, vulcanized fiber or combinations of these materials. A common type of bond system includes a make coat, a size coat, and optionally a supersize coat. The make coat typically includes a tough, resilient polymer binder that adheres the abrasive particles to the backing. The size coat, which also typically includes a tough resilient polymer binder that may be the same as or different from the make coat binder, is applied over the make coat and abrasive particles to further reinforce the particles. The supersize coat, including one or more antiloading ingredients or perhaps grinding aids, may then be applied over the size coat if desired.

In a typical manufacturing process, a coated abrasive article is made in a continuous web form and then converted into a desired construction, such as a sheet, disc, belt, or the like.

The binder may be present as a make coat, size coat and/or a supersize coat. Preferably, the binder is used as a size coat. The binder may be coated by any of the conventional techniques known in the art. The binder is generally cured at a temperature in the range of 75 to 140° C. Low temperature curing can be effected at a temperature of 80 to 90° C. for 20 to 40 minutes. Alternatively, higher temperatures may be employed (e.g., 115 to 125° C.) for shorter cure time periods (e.g., less than 10 minutes). Resin slabs are typically pre-dried at lower temperatures (e.g., 50° C.) prior to curing.

When used as a supersize coat, the binder formulation may comprise antiloading agents, fillers, anti-static agents, lubricants, grinding aids, etc. Examples of such additives include salts and soaps of fatty acids such as lauric acid, myristic acid, palmitic acid, stearic acid, arachic acid and behenic acid, stearate salts, particularly calcium, zinc and lithium stearate, fluorinated compounds, e.g., a fluorochemical compound selected from compounds comprising a fluorinated aliphatic group attached to a polar group or moiety and compounds having a molecular weight of at least about 750 and comprising a non-fluorinated polymeric backbone having a plurality of pendant fluorinated aliphatic groups comprising the higher of (a) a minimum of three C—F bonds, or (b) in which 25% of the C—H bonds have been replaced by C—F bonds such that the fluorochemical compounds comprises at least 15% by weight of fluorine, potassium fluoroborate, sodium fluorosilicate, potassium fluoride, iron sulfide, potassium phosphate, molybdenum disulfide and calcium hydrogen phosphate and the antiloading component disclosed in U.S. Pat. No. 5,704,952 (Law, et al.) incorporated herein by reference.

The backing substrate used in the coated abrasive articles may be selected from any of a wide range of materials including paper, polymeric materials, cloth, and combinations thereof.

The abrasive articles can contain 100% of a single abrasive grain mineral composition. Alternatively, the abrasive article may comprise a blend or mixture of different abrasive grain mineral compositions. The mineral may be coated from 1% to 99% blends, preferably 50 to 95%, to form either open or closed coat construction. Useful conventional abrasive grains include fused aluminum oxide, heat treated aluminum oxide, white fused aluminum oxide, silica, silicon carbide, titanium diboride, boron carbide, tungsten carbide, titanium carbide, diamond, cubic boron nitride, garnet, fused alumina zirconia, sol gel abrasive grains and the like. Examples of sol gel abrasive grains can be found in U.S. Pat. No. 4,314,827 (Leitheiser, et al.); U.S. Pat. No. 4,623,364 (Cottringer, et al.); U.S. Pat. No. 4,744,802 (Schwabel); U.S. Pat. No. 4,770,671 (Monroe, et al.) and U.S. Pat. No. 4,881,951 (Wood, et al.), all of which are incorporated herein by reference. The diamond and cubic boron nitride abrasive grains may be monocrystalline or polycrystalline. The particle size of these conventional abrasive grains can range from about 0.01 to 1500 micrometers, typically between 1 to 1000 micrometers. The abrasive grains may also contain an organic or inorganic coating. Such surface coatings are described, for example, in U.S. Pat. No. 5,011,508 (Wald, et al.); U.S. Pat. No. 1,910,444 (Nicholson); U.S. Pat. No. 3,041,156 (Rowse, et al.); U.S. Pat. No. 5,009,675 (Kunz, et al.); U.S. Pat. No. 4,997,461 (Markhoff-Metheny); U.S. Pat. No. 5,213,591 (Celikkaya, et al.); U.S. Pat. No. 5,085,671 (Martin, et al.); and U.S. Pat. No. 5,042,991 (Kunz, et al.) all of which are incorporated herein by reference.

When used to make coated abrasives, the binder may additionally comprise at least one of an acid filler or neutral filler. Preferred fillers are of the platelet type having a particle size of less than 10 micrometers. Preferred fillers include mica and clays (e.g., kaolin and silane-treated kaolin). Calcium silicate, magnesium calcium silicate may also be used. Specific materials suitable for use as fillers include those under the trade designations: SX400 mica, commercially available from Microfine Minerals Limited, Derby U.K., VANSIL EW20, commercially available from Microfine Minerals Limited, Derby U.K., (Wollastonite, calcium silicate), NYTAL 200, 400 and 7700 (magnesium calcium silicate, commercially available from Microfine Minerals Ltd., Derby, U.K.); POLARITE 102A, commercially available from Imerys Performance Minerals, Roswell Ga. (silane treated calcined kaolin), POLESTAR 200R (calcined kaolin), commercially available from Imerys Performance Minerals, Roswell Ga., kaolin grade E-silane treated, Supreme China Clay (Imerys Co., Paris, France).

The filler is generally employed in an amount from about 5 to about 50% by weight of the dry weight of binder (that being the dry weight of the binder precursor plus the dry weight of the diamine catalyst), preferably from about 15 to about 30%, more preferably about 25% by weight of the dry weight of the binder. The presence of the filler contributes towards the flexural modulus of the cured binder system.

When used to make coated abrasives, the binder may comprise a wetting agent to assist in deflocculating and dispersing the filler. The particular selection of wetting agent will depend upon the filler present in the binder formulation. Suitable wetting agents include esters of polyethylene glycol, ammonium salt of polyacrylic acid and a methacrylamide functional amine adduct of neopentyl-diallyl-oxy-tridioctyl pyro-phosphato titanate. Suitable materials for use as wetting agents for the fillers include those available under the trade designations: DISPEX A40 (ammonium salt of polyacrylic acid, Harcros Chemicals, Inc., Kansas City, Kans.), IRGASTAT 33 (ester of polyethylene glycol, Ciba Specialty Chemicals, Basel, Switzerland), LICA 38J (methacrylamide functional amine adduct of neopentyl-diallyloxy tri-dioctyl pyro-phosphato titanate, Kenrich Petrochemicals Inc., Bayonne, N.J.). The wetting agent is generally used in the range about 0.1 to about 1.0% by weight based on the total weight of filler, although additional amounts may also be useful.

Also, when used to make coated abrasives, the binder formulation may comprise other adjuvants, e.g., a defoamer and other conventional adjuvants typically used in coated abrasive binder formulations.

To provide a better understanding of the present invention including representative advantages thereof, the following examples are offered. It is understood that the examples are for illustrative purposes and should not be regarded as limiting the scope of the invention to any specific materials or conditions.

EXAMPLES

A typical UF resin (SU-100, commercially available from Kolon Chemical, Fairfield, N.J.), a UF designed specifically for a wet laid system, was selected and used as the test binder for all examples that employed UF resin.

For all of the examples, handsheets were prepared on a WILLIAMS Former. 11"×11" mats were made of using various 1" OWENS CORNING ADVANTEX9501 fiberglass (commercially available from Owens Corning, Toledo, Ohio.) The viscosity modifier used, but not limited to, was MAGNAFLOC 835A (commercially available from Ciba Specialty Chemicals, Basel, Switzerland). The dispersant used, but not limited to, was KATAPOL VP532 dispersant. In the case of the composite mat, polyester fiber was added to glass fiber. The wet sheet was transferred to a vacuum station, dewatered and saturated with binder. The binder was prepared to 18% solids using tap water and the mix pH was recorded. The residual cured binder content on each handsheet or LOI (loss on ignition) was targeted to 20% using final basis weight of 1.80 lbs/100 sqft. Each handsheet was cured in a forced air oven (Mathis LTE) for 3 minutes at 350, 375, 400 and 425° F., unless otherwise specified.

LOI represents the percent of UF resin or modified UF resin on the glass fiber mat. A treated mat with a known weight is placed in an oven at a sufficiently high temperature to burn off the binder. After ignition (600 C for 10 min), only glass fiber remains and the weight of the sample is remeasured. The % difference between these weights (the loss due to ignition) provides the % resin or binder in the treated mat.

LOI %=(weight before burning−weight after burning)×100/weight before burning.   Equation:

The handsheets were tested at each cure condition for dry tensile with specimen dimensions of 4"×1.5".

Tension testing was evaluated via INSTRON Tensile testing: 1.5" width jaws with 2" gap pulled at 1"/min until breakage (50% strain rate). Max load at break was deemed the samples tensile strength (lb-f). Dry tensile strengths were conditioned at least 16 hrs at 50% RH and 25° C. prior to testing. At least fourteen specimens were tested per heat cycle.

Comparative Example 1 and Inventive Example 1

In Comparative Example 1, 100% UF resin was added as the binder to provide tensile strength on wet laid fiberglass mats.

In Example 1 of the present invention, a cold blend (non-reacted) of a mixture of urea-formaldehyde resin (UF resin) and polyester resin (TEXFILM 246NB) (10/90 weight ratio on a dry solids basis) was added as the binder to provide tensile strength on wet laid fiberglass mats. TABLE 1 compares, comparative example 1 with inventive example 1, fiber mats made with UF resin to ones made with UF resin and a polyester of the invention. The addition of TEXFILM 246NB (10%) to UF resin increased the dry tensile values 25-35% relative to UF resin binder.

Example 2: TEXFILM 246NB with AC-240 Acrylic Resin for Nonwoven Glass Mat

This example investigated the effects of employing TEXFILM 246NB with AC-240 acrylic resin from Hexion Specialty Chemicals, Inc. as a polymer blend in urea-formaldehyde (UF) binder for nonwoven glass mat. AC-240 acrylic resin is a 45% copolymer solids, 40° C. Tg, self crosslinking acrylic emulsion.

A cold blend (non-reacted) binder, composed of 95/5 w/w mixture of UF resin (65% solids)/AC-240 acrylic resin (45% solids), was added as the binder to provide tensile strength on wet laid fiberglass mats.

For comparison, a cold blend (non-reacted) binder was composed of a polymer blend of 88/7/5 w/w UF resin (65% solids)/TEXFILM 246NB (30% solids)/AC-240 acrylic resin (45% solids) as the binder to provide tensile strength on wet laid fiberglass mats.

TABLE 1 lists the resulting dry tensile strengths. The blend of polyester/acrylic and UF achieved better performance with higher tensile strength on laboratory prepared handsheets than the UF resin alone, the 10% Texfilm 246NB modified UF and the acrylic UF resin.

Example 3: TEXFILM 246NB and SBR for Nonwoven Glass Mat

This example investigated the effects of employing TEXFILM 246NB with DL-490 styrene butadiene rubber (SBR) as a polymer blend in urea-formaldehyde (UF) binder for nonwoven glass mat.

DL-490 SBR is a SBR resin from Dow Reichhold Specialty Latex LLC, commercially available from Research Triangle Park, N.C. DL-490 SBR resin was a 46% solids emulsion.

A cold blend (non-reacted) binder, composed of 94/6 w/w mixture of UF resin (65% solids)/DL-490 SBR (46% solids) was added as the binder to provide tensile strength on wet laid fiberglass mats.

For comparison, a cold blend (non-reacted) binder, polymer blend of 89/5/6 wt. % CASCO FG-472X UF resin (65% solids) (commercially available from Hexion Specialty Chemicals, Inc., Columbus, Ohio)/TEXFILM 246NB (30% solids)/DL-490 SBR resin (46% solids) was added as the binder to provide tensile strength on wet laid fiberglass mats.

TABLE 1 lists the resulting dry tensile strengths. The blend of polyester/SBR and UF achieved higher tensile strength on laboratory prepared handsheets than the UF resin alone as well as the 10% Texfilm 246NB modified UF. The UF/polyester/SBR blend performed better than the SBR/UF at higher heat cycles.

Example 4: TEXFILM 246NB Sulfopolyester and SMA for Nonwoven Glass Mat

This example investigated the effects of employing TEXFILM 246NB sulfopolyester with styrene maleic anhydride (SMA) as a polymer blend in urea-formaldehyde (UF) binder for nonwoven glass mat.

IMPRESS SC-700 was a SMA copolymer solution commercially available from Hercules, Wilmington, Del. IMPRESS SC-700 SMA is a 13% solids aqueous sodium solution of non-esterified styrene maleic-anhydride copolymer. The styrene:maleic anhydride mole ratio is 1:1 and the molecular weight (350,000 weight average). Its structural formula as shown below.

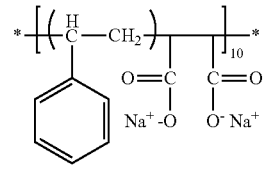

A cold blend (non-reacted) binder, composed of 95/5 w/w mixture of UF resin (65% solids)/IMPRESS SC-700 SMA copolymer solution (13% solids) was added as the binder to provide tensile strength on wet laid fiberglass mats.

For comparison, a cold blend (non-reacted), polymer blend of 88/7/5 w/w UF resin (65% solids)/TEXFILM 246NB (30% solids)/IMPRESS SC-700 SMA copolymer solution (13% solids) was added as the binder to provide tensile strength on wet laid fiberglass mats.

TABLE 1 lists the resulting dry tensile strengths. The blend of polyester/SMA and UF achieved higher tensile strength on laboratory prepared handsheets than the UF resin alone, as well as, the 10% TEXFILM 246NB modified UF. The polyester/SMA and UF also out performed the SMA/UF blend.

Example 5: TEXFILM 246NB and Water Dispersed Polyurethane for Nonwoven Glass Mat This example investigated the effects of employing TEXFILM 246NB with a polyurethane dispersion (PUD) as a polymer blend in urea-formaldehyde (UF) binder for nonwoven glass mat.

The polyurethane dispersion was HAUTHANE L-2020 PUD from C.L. Hauthaway & Sons Corporation, Lynn, Mass. The HAUTHANE L-2020 PUD is a 40% solids, co-solvent free, aromatic, polyether-based polyurethane dispersion.

A cold blend (non-reacted) binder, composed of 95/5 w/w mixture of UF resin (65% solids)/HAUTHANE L-2020 PUD (40% solids) was added as the binder to provide tensile strength on wet laid fiberglass mats.

For comparison, a cold blend (non-reacted) polymer blend of 88/5/7 w/w UF resin (65% solids)/HAUTHANE L-2020 PUD (40% solids)/TEXFILM 246NB (40% solids) was added as the binder to provide tensile strength on wet laid fiberglass mats.

Fourteen specimens were tested per heat cycle.

TABLE 1 lists the resulting dry tensile strengths. The blend of polyester/PUD and UF achieved higher tensile strength on laboratory prepared handsheets than the UF resin alone or the PUD/UF blend.

Example 6: Effects of Other Water Dispersible Polyester-Type Technology

Several water dispersed polyester samples were obtained and compared. TABLE 1 lists the polyesters and dry tensile properties.

10% of the TEXFILM 246NB solution (30% polymer) was added to the UF resin (65% solids), resulting in about 95:5 ratio based on solids. All other modifiers were added to result in an approximate ratio of 95:5 based on solids.

TABLE 2 shows other types of water dispersible polyesters of which two were selected for comparison study with TEXFILM 246NB on non-woven glass mat. The two modifiers were LB-30 and WD-30, both commercially available from Eastman Chemical Company, Kingsport, Tenn.

At 95% confidence level, there were no significant differences between the means of 246NB, WD-30 and LB-30 when comparing data at the equivalent temperatures.

Example 7: Effects of Acrylic Modified Polyester for Non Woven Glass Mat

Senthesize ED (an acrylic modified polyester) resin was abtained from Hexion Specialty Chemicals, Inc.

In Comparative Example 1, 100% UF resin was added as the binder to provide tensile strength on wet laid fiberglass mats.

In example 7 of the present invention, a cold blend (non-reacted) of a mixture of urea-formaldehyde resin and acrylic modified polyester resin (Senthesize ED) (90/10 weight ratio on a dry solids basis) was added as the binder to provide tensile strength on wet laid fiberglass mats. TABLE 1 compares, the 100% UF with the, fiber mats made with UF resin to ones made with UF resin and a acrylic modified polyester. The addition of Senthesize ED (10%) to UF resin increased the dry tensile values 25-35% relative to UF resin binder.

Example 8: Effects of Polyester Acrylic Hybrid

ABCO RES 101 a polyester acrylic hybrid was obtained from Flexion Specialty Chemicals, Inc., Columbus, Ohio.

In Comparative Example 1, 100% UF resin was added as the binder to provide tensile strength on wet laid fiberglass mats.

In example 8 of the present invention, a cold blend (non-reacted) of a mixture of urea-formaldehyde resin and polyester acrylic hybrid resin (ABCO RES 101) (90/10 weight ratio on a dry solids basis) was added as the binder to provide tensile strength on wet laid fiberglass mats. TABLE 1 compares, the 100% UF with the, fiber mats made with UF resin to ones made with UF resin and a polyester acrylic hybrid. The addition of ABCO RES 101 (10%) to UF resin increased the dry tensile values 25-35% relative to UF resin binder.

Comparative Example 3: Effects of Low Molecular Weight Polyether Polyols for Non Woven Glass Mat Polyethylene glycol (molecular weight 400) a polyether diol was obtained from Mallinckrodt baker, Inc.

In comparative example 2, 100% UF resin was added as the binder to provide tensile strength on wet laid fiberglass mats, with a target LOI of 23%.

In comparative example 3, a cold blend (non-reacted) of a mixture of urea-formaldehyde resin (UF resin) and 10% liquid polyether diol was added as the binder to investigate lower molecular weight polyether polyols on the tensile strength of wet laid fiberglass mats. The addition of a polyether polyol of an average molecular weight of approximately 400 (10%) to UF resin had no effect on the dry tensile values relative to UF resin binder of comparison Example 2.

Comparative Example 4 and Inventive Example 9

In a Comparative Example 4, the control binder was 100% of a self crosslinking acrylic emulsion (GL618, commercially available from Rohm & Haas, Philadelphia, Pa.), while used in this example, it is believed various commercially available self-crosslinking acrylics and modified acrylates would demonstrate comparable strength on composite mat, such as those manufactured by H. B. Fuller, Dow Reichhold, Omnova, Parachem, Franklin and Hexion Specialty Chemicals. GL618 synthetic acrylic emulsion latex resin was added as the binder to provide tensile strength on wet laid fiberglass/polyester composite mats.

In Example 9 of the present invention, a cold blend (non-reacted) of a mixture of urea-formaldehyde resin (UF resin) and polyester resin (TEXFILM 246NB) (50/50 weight ratio on a dry solids basis) was added as the binder to provide tensile strength on wet laid fiberglass/polyester composite mats.

In all these examples, the composite sheet was at about 50/50 blend glass fiber/polyester fiber.

Table 1 shows the TEXFILM 246NB polyester and UF resin blend achieved higher tensile strength on laboratory prepared handsheets than the conventional 100% acrylic bonded mat. These results suggested the tensile may improve as much as 10% or more over the acrylic binder.

Table 1 demonstrates the ability of the TEXFILM 246NB and UF resin blend to maintain flexibility (equivalent elongation) when compared to an industry standard, the acrylic bonded mat.

Comparative Example 5 and Inventive Example 10

In a Comparative Example 10, the control, a cold blend (non-reacted) binder was composed of plasticized UF resin (containing 3% proprietary mixture, 1% polyacrylic acid), on a 50/50 solids basis blend with a self crosslinking acrylic emulsion. The synthetic acrylic emulsion latex resin was added to the binder to provide tensile strength on wet laid fiberglass/polyester composite mats.

In Example 10 of the present invention, a cold blend (non-reacted) binder was composed of plasticized UF resin (containing 3% proprietary mixture, 1% polyacrylic acid), on a 50/50 solids basis blend with a polyester resin (TEXFILM 246NB) was added as the binder to provide tensile strength on wet laid fiberglass/polyester composite mats.

In all these examples, the composite sheet was at 50/50 blend of glass fiber/polyester fiber.

TABLE 1 shows the 50/50 blend of TEXFILM 246NB polyester and plasticized UF resin achieved higher tensile strength on laboratory prepared handsheets than the 50/50 blend of acrylic and plasticized UF.

TABLE 1A demonstrates the ability of the 50/50 blend of TEXFILM 246NB and plasticized UF resin blend to maintain flexibility (equivalent elongation) when compared to the 50/50 acrylic and plasticized UF resin blend.

TABLE 1

(Tensile Strength (lb-f))

| Sample | | 3 min. cure in degrees F. | | | |
|---|---|---|---|---|---|
| | | 350 | 375 | 400 | 425 |
| Comparative example 1 | UF resin | 55.80 | 54.10 | 52.30 | 51.00 |
| Inventive example 1 | UF resin + 10 wt. % TEXTFILM246NB | 68.10 | 67.30 | 65.20 | 61.40 |
| | polymer blends with TEXTFILM 246NB in UF resin | | | | |
| example 2 | UF resin/AC-240 | 70.92 | 71.85 | 68.14 | 61.20 |
| | UF resin/AC-240/TEXTFILM 246NB | 70.22 | 73.70 | 75.56 | 67.33 |
| example 3 | UF resin/DL-490 | 77.79 | 67.04 | 67.89 | 60.70 |
| | UF resin/DL-490/TEXTFILM 246NB | 74.56 | 68.23 | 71.32 | 72.54 |
| example 4 | UF resin/SC-700 | 67.82 | 68.61 | 72.96 | 64.29 |
| | UF resin/Impress SC-700/TEXTFILM 246NB | 74.36 | 71.12 | 73.13 | 74.19 |
| example 5 | UF resin/HAUTHANE IL-2020 | 60.42 | 55.60 | 62.05 | 52.65 |
| | UF resin/HAUTHANE L-2020/TEXTFILM 246NB | 62.52 | 62.45 | 66.20 | 62.76 |
| | Polyesters compared to TEXFILM 246NB | | | | |
| example 6 | UF resin/TEXTFILM 246NB | 66.68 | 68.54 | 61.64 | 59.58 |
| | UF resin/WD-30 | 63.01 | 68.30 | 67.17 | 62.97 |
| | UF resin/LB-30 | 67.47 | 68.00 | 67.29 | 60.07 |
| | Polyester Acrylic modified | | | | |
| example 7 | UF resin/10% Synthize ED | 68.14 | 69.11 | 66.86 | 61.75 |
| | Polyester Acrylic "Hybrid" | | | | |
| example 8 | UF resin/10% abco res101 | 71.90 | 65.53 | 65.53 | 67.33 |
| | Polyether polyol (23% LOI non woven mat) | | | | |
| comparative example 2 | UF resin | 66.31 | 65.04 | 60.96 | 52.57 |
| comparative example 3 | UF resin/10% polyether polyol | 65.58 | 61.78 | 52.23 | 56.33 |
| | Composite mat | | | | |
| Comparative example 4 | 100% GL618 | 59.90 | | 69.30 | |
| Inventive example 9 | 50/50 wt. % TEXTFILM 246NB and UF resin | 73.80 | | 74.00 | |
| Comparative example 4 | UF (plasticized) 50/50 wt. % GL-618 | 81.50 | | 73.70 | |
| Inventive example 10 | UF (plasticized) 50/50 wt. % TEXTFILM 246NB | 95.40 | | 88.00 | |

TABLE 1A

| Composite mat | % Elongation |
|---|---|
| Comparative example 4 | 3.10 |
| Inventive example 9 | 3.10 |
| Comparative example 4 | 3.30 |
| Inventive example 10 | 3.40 |

TABLE 2

| Product Name | Solids, % | Dry Polymer Tg ° C.* | pH |
|---|---|---|---|
| EASTMAN WD-30 | 30 | 29 | 5.9 |
| EASTMAN LB-30 | 30 | 35 | 5.0 |
| EASTMAN ES-25 | 25 | 43 | 6.5 |
| TEXFILM 246NB | 30 | 52 | 5.6 |
| NORPOL 9700 | 30 | 45 | 3.5 |
| SYNTHESIZE ED | 30 | 50 | 4.5 |
| ABCO RES 101 | 20 | 17 | 7.5 |

*Tg = Glass Transition Temperature

The conclusions based on this data indicate that all the tested polyester modifiers enhance the UF resin's performance.

The forms of invention shown and described herein are to be considered only as illustrative. It will be apparent to those skilled in the art that numerous modifications may be made therein without departing from the spirit of the invention and the scope of the appended claims.

What is claimed is:

1. An aqueous binder comprising a mixture of:
   a water dispersible urea-formaldehyde resin, and
   a water dispersible polyester resin,
   wherein said mixture comprises about 10 to about 25 wt % said water dispersible polyester resin based upon the dry weight of the urea-formaldehyde resin, wherein the binder has an absence of phosphate groups, wherein said water dispersible polyester resin has a weight average molecular weight of 10,000 to 500,000, wherein the aqueous binder contains substantially no cross-linking agents, and wherein the urea-formaldehyde resin is not a cross-linking resin for the water dispersible polyester resin.

2. The binder of claim 1, wherein the aqueous binder contains substantially no cross-linked polymers or unreacted epoxy.

3. The binder of claim 1, wherein the polyester resin is sulfonated.

4. The binder of claim 1, wherein the binder system is essentially free from latex.

5. The binder of claim 1, wherein the polyester resin has a molecular weight of 25,000 to 70,000.

6. The binder of claim 1, wherein the aqueous binder contains substantially no isocyanates, substantially no phosphate-containing polymer, substantially no epoxy, substantially no hydroxyethyl acrylate, no organic solvent, and no solid particulates.

7. The binder of claim 1, wherein the aqueous binder contains substantially no polyether polyol and no polyhydroxy polyester.

8. The binder of claim 1, wherein the aqueous binder contains substantially no cross-linked polymers other than optionally the water dispersible polyester resin cross-linked with itself.

9. The binder of claim 1, wherein the aqueous binder contains substantially no cross-linked polymers.

10. The binder of claim 1, wherein the aqueous binder contains substantially no cross-linking agents, substantially no epoxy, substantially no unreacted epoxy, substantially no polyester resins with urethane in the polyester backbone, substantially no phosphate-containing polymer, substantially no hydroxyethyl acrylate, no organic solvent, and/or no solid particulates.

11. The binder of claim 1, wherein the urea-formaldehyde resin is a modified urea-formaldehyde resin comprising a melamine formaldehyde resin.

12. The binder according to claim 1, wherein the aqueous binder has a total polymer content of the urea-formaldehyde resin and polyester resin of about 60 weight % or less.

13. The binder of claim 1, wherein based on the total polymer content of the urea-formaldehyde resin and polyester resin, the binder contains from about 60 weight % to about 80 weight % of the polyester resin and from about 20 weight % to about 40 weight % of the urea-form aldehyde resin.

14. The binder of claim 1, wherein the polyester resin is a sulfopolyester formed as a polycondensation product of:
(1) a first reaction mixture comprising: (a) at least about 70 mol. % dicarboxylic acid or an ester thereof, and (b) about 4-20 mol. % of a difunctional ester forming sulfomonomer containing at least one metal sulfonate group attached to an aromatic nucleus, and functional groups selected from the group consisting of hydroxyls, carboxyls and alkyl esters for a total of 100 mol %; and
(2) a second reaction mixture comprising ethylene glycol, diethylene glycol and optionally triethylene glycol, for a total of about 100 mol. %.

15. The binder of claim 14,
wherein the sulfopolyester has an inherent viscosity of at least about 0.20 dL/g measured at 250° C. in 60/40 parts by weight of a phenol/tetrachloroethane solvent at a concentration of 0.25 g/dL, and
wherein the second reaction mixture comprising ethylene glycol, diethylene glycol and optionally triethylene glycol, at least about 20 mol. % of the second reaction mixture being ethylene glycol.

16. The binder of claim 14, wherein the dicarboxylic acid or an ester thereof comprises terephthalic acid or an ester thereof and the at least about 20 mol. % of the second reaction mixture is ethylene glycol.

17. The binder of claim 14, wherein the first reaction mixture (A)(1) further comprises from about 0.1 mol. % to about 5 mol. % of a saturated aliphatic or a saturated alicyclic dicarboxylic acid, or ester thereof.

18. The binder of claim 14, wherein the mixture of a water dispersible urea-formaldehyde resin and a water dispersible polyester resin further comprises a member of the group consisting of acrylic polymer, styrene butadiene rubber, styrene maleic anhydride, and polyurethane dispersion.

19. The binder of claim 14, wherein the polyester is a polyester, a polyester acrylic hybrid polymer, a polyester acrylic grafted polymer or a polyester extended with at least one member of the group consisting of polyethylene glycol and polyvinyl alcohol.

20. The binder of claim 14, wherein the difunctional ester forming sulfomonomer is 5-sodiosulfoisophthalic acid or an ester thereof.

21. The binder of claim 14, wherein the difunctional ester forming sulfomonomer is 5-sodiosulfoisophthalic acid or an ester thereof, the dicarboxylic acid or an ester thereof comprises terephthalic acid, and the mol. ratio of terephthalic acid to 5-sodiosulfoisophthalie acid is approximately 80-90/20-10.

22. A composite mat comprising the binder system of claim 1.

23. The composite mat of claim 22, having a percent retention of at least 50%.

24. A coated abrasive comprising a substrate, a coating on the substrate comprising abrasive particles and the binder system of claim 1.

* * * * *